March 1, 1960     E. C. KIMBALL     2,926,480
PRUNING APPARATUS

Filed Nov. 25, 1957     2 Sheets-Sheet 1

INVENTOR.
EUGENE C. KIMBALL
BY *Elliott & Pastoriza*
ATTORNEYS

United States Patent Office 2,926,480
Patented Mar. 1, 1960

2,926,480

PRUNING APPARATUS

Eugene C. Kimball, Ventura, Calif.

Application November 25, 1957, Serial No. 698,801

2 Claims. (Cl. 56—235)

This invention generally relates to an apparatus for pruning or trimming trees, hedges, or the like to a given height, and the invention more particularly concerns portable pruning apparatus for the above purpose which may be advantageously employed in pruning rows of trees, bushes, shrubs, and hedges in a mechanized manner.

It will be appreciated that in order to encourage the development of fruit-bearing trees to achieve maximum crops, it is desirable to trim the trees to a given height, thereby causing the trees to become bushier and grow radially outward. Not only does this pruning or trimming process increase fruit production, but it also provides fruit growth at a height more convenient and economical for fruit-picking operations.

It will be appreciated that pruning or trimming trees which have matured to a height of ten or fifteen feet or more is a cumbersome and time consuming operation, which does not readily lend itself to mechanization. Various efforts have been made in the past to develop suitable apparatus for mechanical pruning of trees or the like to a given height; however, most apparatus which has been developed does not satisfactorily meet the requirements. The problem is particularly acute where branches, limbs, or twigs may be of varying thickness and in different spaced relationship with each other with the result, for example, that some terminal portions of the tree may merely be bent back or partially broken, while only the remaining portions may be effectively cut off.

Further, a difficulty has been encountered in causing the cuttings to be thrown out of the tree such that they will not harm the underlying fruit or branches which are retained.

It is, therefore, an object of the present invention to provide a pruning apparatus for trimming trees or the like to a given height which is effective to cut branches, twigs, or limbs of varying sizes and spacing in an effective manner.

Another object of the present invention is to provide a pruning apparatus for trimming trees or the like to a given height which functions to cause the resultant cuttings to be thrown in a path away from the tree such that they will fall to the ground rather than into the retained portion of the tree.

Another object of the present apparatus is to provide a pruning apparatus for trimming trees or the like to a given height which is adaptable to relatively high speed operation wherein it may be employed for pruning rows of trees, lengths of hedges, or the like in a minimum amount of time.

Another object of the present apparatus is to provide a pruning apparatus for trimming trees or the like to a given height which may be constructed to be conveniently operated by one man, and which is dimensioned for portable use in orchards or the like where trees are planted in conventional spacing.

Still another object of the present invention is to provide a pruning apparatus for trimming trees or the like to a given height, which may be manufactured to be of simple and rugged construction with a minimum number of wearing parts.

These and other objects and advantages of the present invention for an apparatus for pruning trees are generally attained by providing in combination a portable frame adapted for movement along the ground in a direction parallel and adjacent to a row of trees or a length of hedge. An elongated member is coupled to and extends upwardly from the frame, and carrier means are coupled to the elongated member for vertical movement with respect to the frame.

Rotatable blade means are coupled to the carrier means for movement in a desired cutting or pruning plane usually parallel to the normal ground level. Thus, upon raising or lowering of the elongated member, the blade means are similarly raised or lowered to different planes with respect to the ground so as to vary the cutting height.

Vertical positioning means are connected to the carrier means for locating the blade means to the given height as aforesaid. In addition, power means are suitably mounted on the frame driving rotatable blade means.

In a preferred construction, the elongated member is pivotally mounted to the frame, and leveling means are coupled to the elongated member for pivoting the same with respect to the frame and thereby causing angulation of the plane of the rotatable blade means. Such angulation is desirable when the ground level over which the portable frame is moved is not completely flat. Thus, the leveling means may be used to retain the rotatable blade means in any desired plane, in most instances parallel to the normal ground level.

A better understanding of the present invention will be had by reference to the drawings, which are partially schematic and disclose only one illustrative embodiment, and in which.

Figure 1:
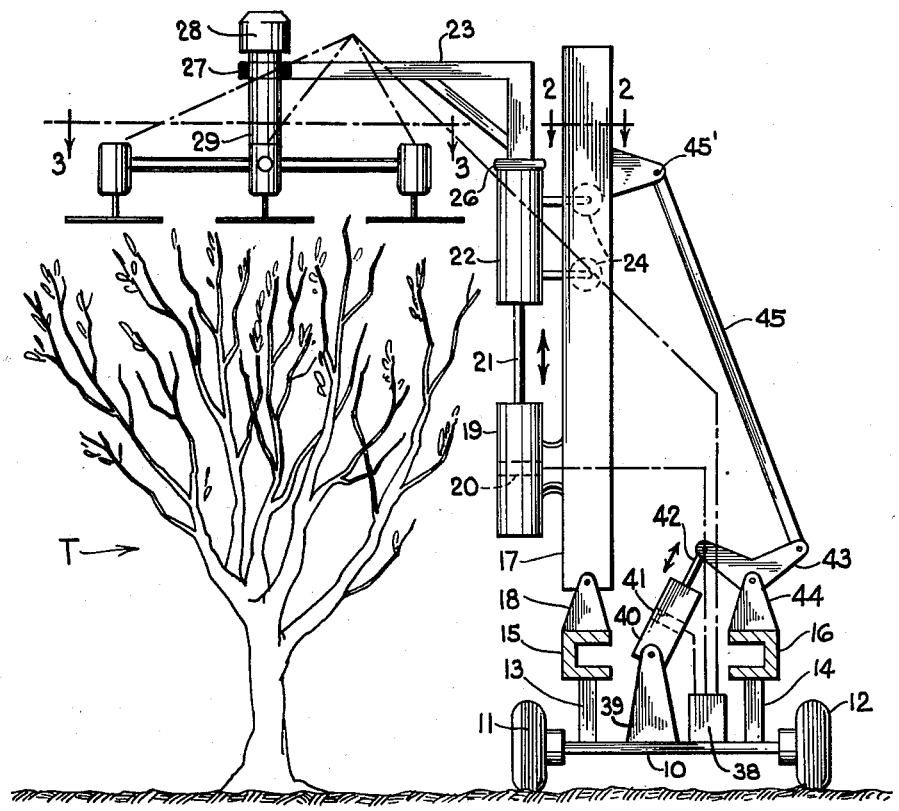
Figure 1 is a schematic representation of the pruning apparatus according to the present invention with parts shown in section.

Referring now to the drawings, there is shown in Figure 1 a schematic representation of the pruning apparatus according to the present invention including a chassis frame 10 suitably supported on wheels 11 and 12. The frame 10 has mounted thereon lengthwise supports 13 and 14, which in turn form foundations for girders 15 and 16, respectively.

The girder 15 forms a base for mounting thereon an elongated channel member 17, which is pivotably secured to a pedestal 18. The channel member 17 has secured thereto a piston assembly comprising a cylinder 19 having a double acting piston 20 slidably mounted therein. The piston 20 has extending therefrom a rod 21, which is rigidly coupled to carrier means including a member 22. The remainder of the carrier means is formed by a right angular member 23 which extends laterally from the frame 10 to a position above the tree T.

Figure 2:
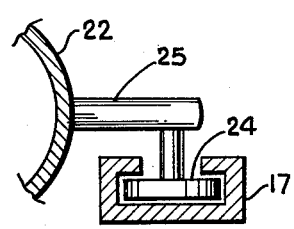
Figure 2 is an enlarged sectional view taken in the direction of the arrows 2—2 of Figure 1.

The member 22, as more clearly shown in the view of Figure 2, has connected thereto rollers 24 adapted to ride within the channel member 17. The rollers 24 may be coupled between the member 22 and the channel member 17 as with any type of conventional brackets 25. Thus, in response to up or down movement of the piston rod 21, the member 22 and associated carrier arm 23 will correspondingly be moved up or down to in turn vary the height of the arm 23 with respect to the tree T.

It will be appreciated that during times when the apparatus may be moved over public roads or in other instances when the apparatus is not being operated, it is desirable to adjust the carrier means and more particularly the arm 23 thereof to a position aligned lengthwise with the apparatus. For this purpose, a bearing 26 is provided between the member 22 and the carrier arm 23 enabling swiveling of the carrier arm 23 to a position at right angles to the position schematically shown in Figure 1. Although no particular structure has been shown for thus moving the carrier arm 23, it will be appreciated that various types of linkages, rope and pulley set-ups or the like may be employed as a force means accomplishing this purpose.

Figure 3:
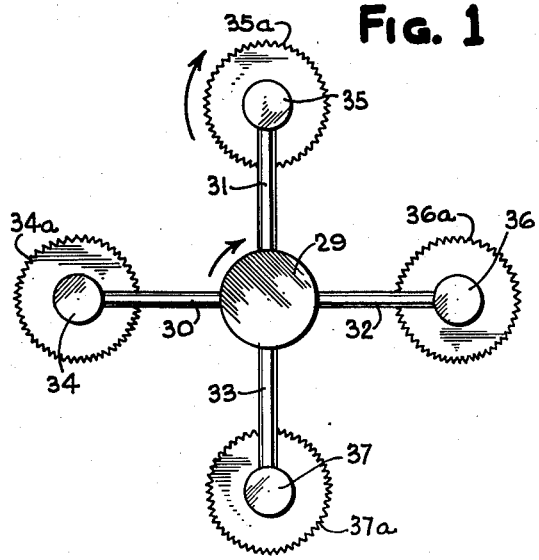
Figure 3 is an enlarged top elevational view taken in the direction of the arrows 3—3 of Figure 1; and, Figure 4 is a diagram illustrating one form of electrical and hydraulic system which might be employed in conjunction with the pruning apparatus of Figure 1.

There is provided at the free end of the carrier arm 23 thrust bearing means 27 designed to accommodate and rotatably support a main motor 28 and its associated downwardly extending shaft 29. The shaft 29, as more clearly shown in the view of Figure 3, is rigidly coupled at its outer end to a plurality of radially extending wheel arms 30, 31, 32, and 33. The wheel arms in turn have rigidly attached to their outer ends auxiliary motors 34, 35, 36, and 37, respectively. The motors are, in turn, rotatably coupled to cutting blade means in the form of circular saws 34a, 35a, 36a, and 37a.

With this type of construction, as the frame 10 moves along the ground, the rotating blade means will be moving in a linear direction in a plane substantially parallel to the normal ground level, although this plane may be at an angle to the ground depending on the pruning requirements. At the same time the shaft 29 will be rotating causing coupled cutting blades 34a through 37a to rotate therewith. In addition, the individual saw blades will also be rotating with respect to the shaft 29. The importance of the various cutting blade means will be more clearly understood at the time the operation of the pruning apparatus is explained subsequently in the specification.

In order to drive the main motor 28 and the auxiliary motors 34, 35, 36, and 37, a stationary power assembly 38 is provided on the frame 10. The stationary power assembly may comprise a motor generator set for electrical power and a suitable hydraulic system. Thus, as indicated by the dotted lines in Figure 1, the hydraulic system in the power supply 38 would be used to supply pressurized fluid to either side of the double acting piston 20, while the electrical power supply would be used to energize the motors 28, and 34 through 37.

Under certain conditions the ground level under the wheels 11 and 12 may be sloped such that, for example, the wheel 12 is higher than the wheel 11. Under such circumstances, it is normally desirable to maintain the cutting blade means or saw blades 34a through 37a in a plane substantially parallel to the normal ground level so that the tree T will be cut to a level height. For this purpose, there is provided on the frame 10 a pedestal 39 to which is mounted a piston assembly including a cylinder 40 and double acting piston 41. A piston rod 42 is connected to the piston 41 and to a rocker arm 43 pivotably mounted on another pedestal 44. An arm 45 is, in turn, coupled to another portion of the rocker arm 43 and connected as at 45' in a pivotable mounting to the main channel member 17.

With this type of construction, when the wheel 12 is disposed in a position above the level of the wheel 11 because of some sloping or other variation in the ground level, the piston 41 may be actuated in an upward direction, thereby tending to draw down the arm 45 and pivot the member 17 in a direction away from the tree T. Preferably, some type of automatic means is used for this purpose.

Figure 4:
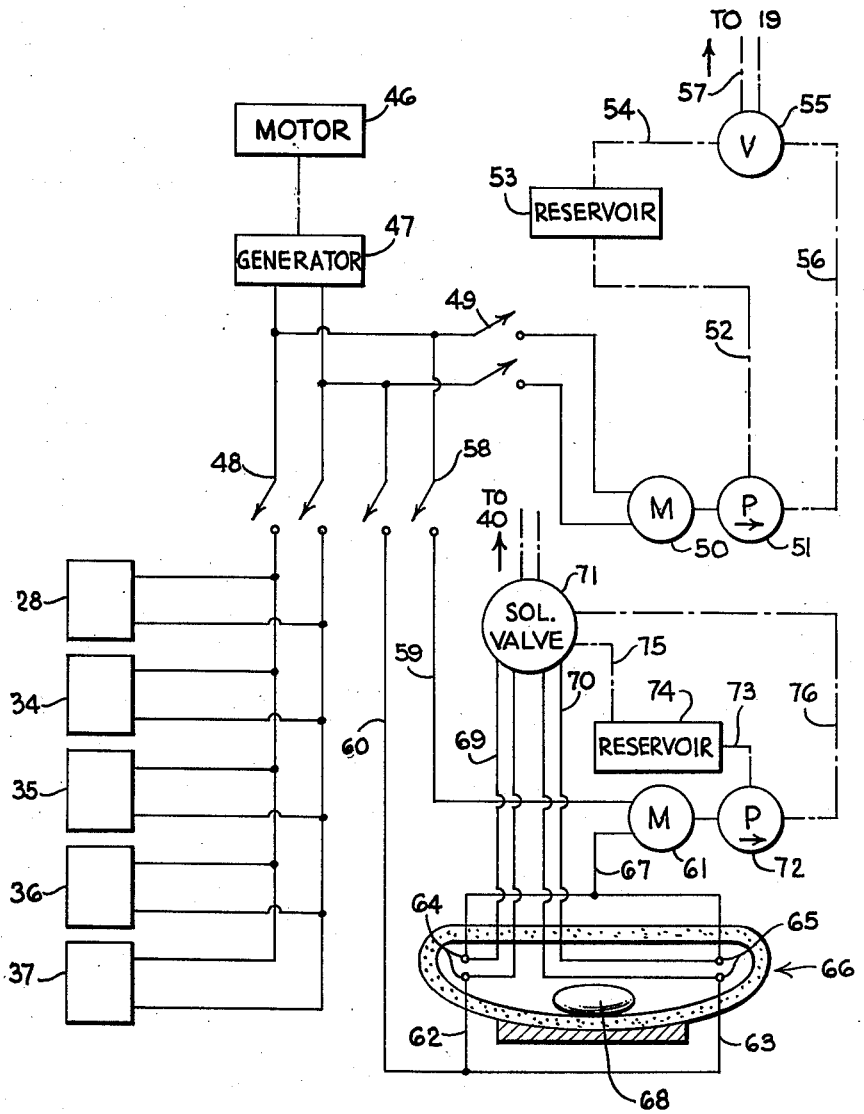

In order to explain how one form of electrical system and hydraulic means can be employed for driving the motors 28 and 34 through 37, as well as the pistons 20 and 41, reference may be had to Figure 4 illustrating a diagrammatic electrical and hydraulic system which could be used.

In this illustrative system, the power assembly includes an internal combustion engine or motor 46 used to drive an electric generator 47. The generator 47 is connected through a switch 48 to the main motor 28 and the auxiliary motors 34 through 37, all connected in parallel. In addition, a switch 49 is provided in the leads from the generator, which upon closing is adapted to establish an electric circuit through a motor 50 driving a hydraulic pump 51. The pump 51 is in turn connected in a hydraulic circuit, including a line 52 leading to a reservoir 53. On the other side of the reservoir, a line 54, connects with a three-way valve 55. Another line 57 connects between the valve 55 and the pump. The valve also has lines 57 leading to the hydraulic cylinder 19 described in Figure 1. With this type of system, depending upon the position of the valve 55, fluid is either pumped to one or the other sides of the double acting piston 20, or could merely be caused to flow through the closed circuit including the reservoir 53 and lines 52, 54, and 56.

In addition, the generator is connected to a switch 58 connecting across lines 59 and 60 leading to a motor 61. In order to cause motor 61 only to operate at such times as the wheels 11 and 12 (as shown in Figure 1) are not level, the line 60 has connected thereto some form of mercury switch or other device responsive to relative changes in the level of the wheels. Towards this end, the line 60 is shown as having branch members 62 and 63 with terminals 64 and 65, respectively, interposed in the mercury switch 66 leading to a line 67 connected to the motor 61. The mercury switch might be of any conventional construction including a globule of mercury 68 normally disposed in the position shown.

As soon as the wheels 11 and 12 are not level, the mercury 68 either flows towards the terminal 64 or the terminal 65. Upon contact with either of these terminals, a circuit would be established connecting the motor 61 to cause its operation.

Since the piston 41 must be either raised or lowered depending upon which wheel is raised or lowered, some form of valve means must be connected in association with the respective terminals 64 and 65 to properly increase pressure on one or the other side of the piston 41. Towards this end, there are shown leads 69 leading from terminal 64, and leads 70 leading from terminal 65 to a solenoid valve 71. The solenoid valve 71 functions for a similar purpose as the control valve 55 previously described, except that the solenoid valve 71 is automatically operated upon any unleveling of the wheels 11 and 12.

The hydraulic system also includes a pump 72 connected through a line 73 to a reservoir 74. The reservoir 74 is in turn connected through a line 75 to the solenoid valve. In addition, a line 76 connects from the solenoid valve back to the pump 72.

With this type of construction, assuming for example the wheel 12 were raised, the mercury 68 would flow so as to short the terminals 64. Upon shorting of the terminals 64, the solenoid valve 71 would be actuated so as to cause pressurized fluid to flow to the lower side of the piston 41 and level the carrier means or arm 23 by pivoting of the main channel member 17. An opposite sequence of operation would, of course, be established in the event terminals 65 were closed upon raising of wheel 1.

In the operation of the pruning apparatus of the present invention, the frame 10 (of Figure 1) could either be mounted on a trailer pulled by a tractor or the like or it could be incorporated in a self-propelling truck or similar vehicle. As the apparatus is being pulled towards the particular working location, the carrier arm 23 would be swiveled to a position at right angles to the position as shown in Figure 1 such that the unit would have a minimum width.

Upon arriving at location the carrier arm would be swung to the position of Figure 1 and the control valve 55 (Figure 4) operated to lower the piston 20 and correspondingly lower the saws 34a through 37a down to the given height required for proper pruning. Thereafter, the switches 48, 49, and 58 would be closed to effect rotation of the shaft 29 and the coupled saws. In addition, the leveling means would be ready for operation in the manner required, as heretofore explained in the event any variations occurred in the ground contour.

It will be apparent that several advantages accrue from using a cutting blade arrangement as shown in Figure 3. By rotating the shaft 29 at a relatively high speed and moving the wheels 11 and 12 at a relatively low speed, it will be seen that two or possibly three saws will pass through the area accupied by any given branch. In addition, by circumferentially spacing these saws, in the event a branch springs up after merely bending over, the next saw encountering the branch will tend to cut it off. Furthermore, by the double rotation effect given to each of the saws, any cuttings or brush which are cut from the tree T are thrown away from the tree and do not fall down to injure fruit or the like on the tree. It will be further appreciated that the saws in their linear movement effect a double cutting action by again crossing the location of any given branch after movement of the carrier arm 23 a distance, varying between the radius and diameter of the rotating blade apparatus.

It is evident, however, that various numbers of saws may be used and that the illustration of four saws being used is only one example of an embodiment of the present invention. It is conceivable, depending on the particular application of the pruning apparatus and the relative speeds of rotation of the saws, the shaft 29, and the forward movement of the vehicle that a lesser or larger number of saws could be employed with satisfactory results. It is further evident that many modifications and changes may be made in the overall apparatus particularly with respect to the power means employed in the electrical and hydraulic systems without departing from the spirit and scope of the invention as set forth in the following claims.

What is claimed is:

1. An apparatus for pruning trees or the like to the level of a given plane comprising: a portable frame adapted for linear movement along the ground in a direction parallel and adjacent to a row of said trees; an elongated member pivotably coupled to a side of said frame and extending upwardly therefrom; carrier means coupled to said elongated member for vertical movement relative to said elongated member, said carrier means supporting an arm member extending laterally from said side of said frame to a first position over said trees; a shaft rotatably journaled in said arm member; bearing means interposed between said arm member and said carrier means enabling pivotal movement of said arm member to a second position in parallel alignment with said side of said frame; first driving means for driving said shaft; a plurality of circular cutting blades coupled for rotation with said shaft and rigidly supported in circumferential spaced relationship at a given radius from the axis of said shaft; second driving means adapted to effect rotation of said blades; and, positioning means connected to said carrier means for locating said blade means to said given plane.

2. An apparatus for pruning trees or the like to the level of a given plane comprising: a portable frame adapted for linear movement along the ground in a direction parallel and adjacent to a row of said trees; an elongated member pivotably coupled to a side of said frame and extending upwardly therefrom; carrier means coupled to said elongated member for vertical movement relative to said elongated member; a shaft rotatably journaled in said carrier means; first driving means for driving said shaft; a plurality of circular cutting blades coupled for rotation with said shaft and rigidly supported in circumferentially spaced relationship at a given radius from the axis of said shaft; second driving means adapted to effect rotation of said blades; leveling means adapted to pivot said elongated member relative to said given plane; and, means responsive to a variation in the level of said frame for automatically actuating said leveling means.

References Cited in the file of this patent

UNITED STATES PATENTS

| 1,869,394 | Sikma | Aug. 2, 1932 |
| 2,194,617 | Scott | Mar. 26, 1940 |
| 2,506,215 | Hays | May 2, 1950 |
| 2,589,553 | Kesselring | Mar. 18, 1952 |
| 2,644,598 | Winslow | July 7, 1953 |
| 2,712,391 | Jones | July 5, 1955 |

FOREIGN PATENTS

| 561,490 | Great Britain | May 22, 1944 |